Patented Jan. 1, 1935

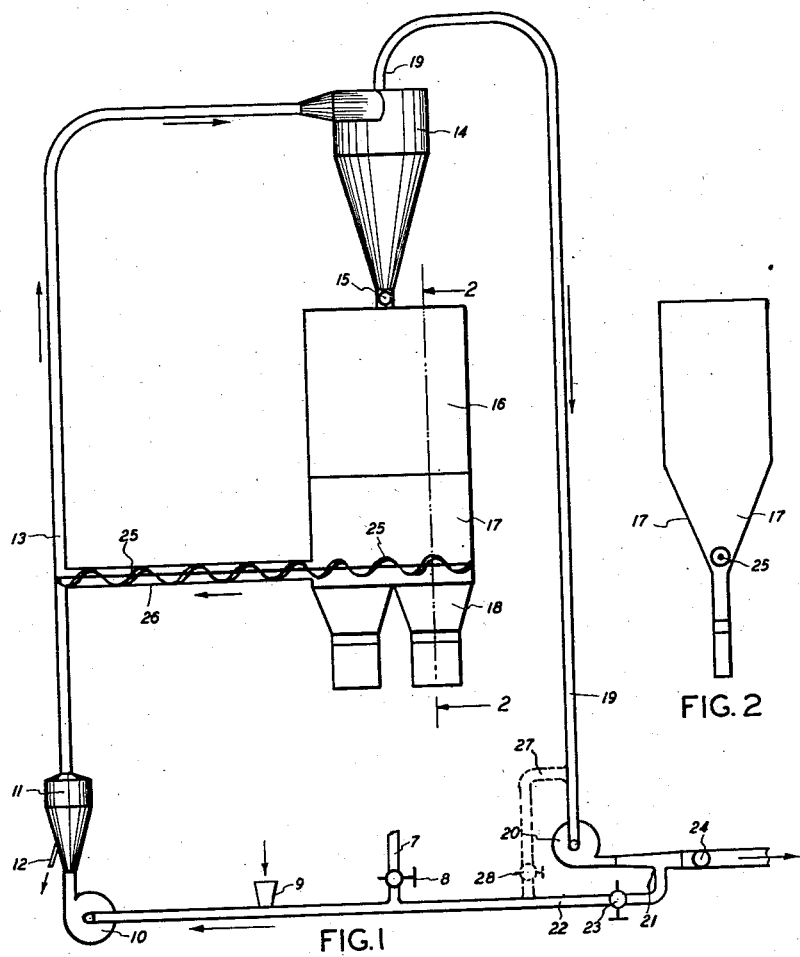

1,986,301

UNITED STATES PATENT OFFICE 1,986,301

BLENDING AND AIR SEPARATION OF DIATOMACEOUS EARTH POWDERS

McKinley Stockton, Redondo Beach, Calif., assignor to The Dicalite Company, Los Angeles, Calif., a corporation of Delaware Application July 29, 1933, Serial No. 682,864

5 Claims. (Cl. 209—143)

An object of my invention is to provide means and a method for blending, intimately commingling and equalizing mixtures of certain powdered or comminuted substances which, by reason of the form of their component particles, tend to become impacted into solid masses when subjected to pressure.

An object of my invention is to provide for transferring and blending comminuted materials which, by reason of the structural weakness of their component particles, cannot be subjected to pressure, abrasion or impact without suffering further disintegration and the loss of certain desired properties.

An object of my invention is to provide for transferring and blending materials which are excessively bulky when reduced to a comminuted form.

A specific object of my invention is to provide for the equalization of variable mixtures of diatomaceous earth (also known as infusorial earth, kieselguhr, etc.), this material exhibiting to an excessive degree the properties of ready impaction, frailty of structure and bulkiness.

My invention may be applied to the manipulation of numerous powdered or comminuted materials having one or more of the above properties, such as the softer varieties of clay, flocculent chemical precipitates, acid-treated decolorizing earths, wood pulp, paper pulp, rag felt and the like, but I will first describe its application to diatomaceous earth as a typical material and one which it has heretofore been found impossible to blend or to repeatedly handle in any satisfactory manner.

Diatomaceous earth is placed on the market in various grades, each having properties adapted to the use to which that grade is to be put. Such properties are, for example: porosity or capacity for absorbing liquids and fine suspensoids; flow rate or capacity for passing liquids when used as a filtering material, and retention value, a measure of ability to retain the finest suspensoids in the filter cake.

Each of these properties, as measured in any given sample of the finished material, is the composite result of several variable factors, such as quality of crude material, moisture content, average fineness, and spread of fineness of grain, degree of calcination and others.

Each of these variables has a wide range of value and, as they profoundly influence each other, their combined or even their individual effects are difficult if not impossible to control. For example, the crude material occurs in relatively thin strata or lenses having different properties. The crude material may be heated in a kiln in which, at even a constant rate of feed and firing, a variation in the character of the crude supplied or even in the size of the lumps in which the crude occurs will affect the degree of calcination and the moisture content. These characteristics, in turn, affect the average fineness of the pulverized output of any given milling unit even when operated at constant feed and throughput, because of their effect on the relative toughness of the crude material.

In the prior art, attempts have been made to control the properties of the finished product by first testing the various crude materials available and mixing these crudes in various proportions. Variations in such controls as temperature, air separation etc. have also been used to compensate fluctuations in the quality of the material in process. Such control methods are commonly used by most producers of diatomaceous earth products, but have been found to be very little effective in obtaining a product of uniform character.

Lack of uniformity is, for many purposes, highly objectionable to the consumer, his processes usually being based on performance data supplied by the manufacturer. These data are necessarily the average of rather lengthy production periods and do not take into account the fluctuations in quality which, in production by methods now in use, are often so sudden as to be perceptible and material from one bag to the next, while the consumer often uses each bag as an individual lot. Even in cases where the consumer makes his own tests his results usually represent the average of a large number of bags, often of a carload of twenty-five to thirty tons.

Because of these variations, which have heretofore been unavoidable, the producer has found it necessary to restrict his guarantees as to uniformity in such manner as to admit wide ranges of variation, in order to avoid the rejection of a considerable proportion of the finished product. And as these variations are detrimental to the consumer's processes, a more desirable, valuable and saleable product results from any change in manufacturing method which enables the producer to bring his limit guarantees within a closer range.

Where the quality of a continuous stream of product is momentarily and widely variable, the obvious method of producing uniformity is to accumulate and to thoroughly intermix and equalize a considerable quantity of the output. Where liquids or fluent powders are concerned, many well known mixing devices are available, most of them operating either on the principle of stirring by mechanically actuated sweeps, paddles or propellers, of tumbling in a revolving container, or of circulating out of and into a tank or other vessel containing a quantity of the material to be intermixed.

The stirring principle is not applicable to this material nor to any powder which tends strongly to impact. Diatomaceous earth consists, as is well known, of microscopic tubular and ring shaped bodies of silica, and this structure tends so strongly to felt and mat that the power consumption required for stirring is prohibitive. Further, the bulk of the powder is so extreme that a power mixer to handle even a single carload would be inordinately expensive, and the tubular structure, on the maintenance of which the valuable property of porosity depends, is so frail that it is seriously broken down and depreciated by crushing.

The tumbling principle is more nearly applicable to small quantities, though even for these the tendency of the powder to ball renders the device only moderately effective. It is obviously impracticable for handling carload lots of material having a loose weight of approximately nine pounds per cubic foot, requiring a tumbler in excess of 6,000 cubic feet capacity for handling thirty tons.

In order to provide means for the complete intermixture and averaging of either the output stream from a continuous process or an accumulated batch of such material, I have devised an apparatus utilizing the general principle of circulation but applying it in a new and novel manner which renders it highly efficient as a mixing means while avoiding all undesirable secondary effects.

An illustrative embodiment of my invention of apparatus, which serves also to illustrate the operating methods set forth in certain of the claims, is shown in a highly diagrammatic manner in the attached drawing, in which Fig. 1 is an elevation of the entire apparatus Fig. 2 is a section through the bin 16, as on the line 2—2 of Fig. 1.

Referring to the drawing, a pipe 7 controlled by a valve or damper 8 delivers to an air blower 10 a stream of air at relatively high velocity, this air stream carrying into the blower, in suspension, a dried, partially milled and otherwise processed earth.

By way of explanation, the large lumps of earth as mined may be crushed, partially dried, milled to the state of a coarse powder and delivered in this state into pipe 7 as through a hopper or other opening indicated at 9, or this powder may be further dried or calcined in a rotary kiln before entering this pipe. These preliminary steps are variable according to the nature of the crude material and of the desired product, are no part of the present invention, and are described merely to show the nature of the material later referred to.

In any case, however, a further milling and comminution of the material entering blower 10 is unavoidable, the fragility of the earth being such that the fan blades and casing function as an impact pulverizer to produce this effect. The speed of this mill and the nature and extent of the prior steps of drying and partial milling are so controlled that the material delivered by the mill or blower 10 will be reduced to exactly the desired state of fineness. This finally comminuted earth is delivered by the blower into a separator 11 where sand, grit, flint and any other unmilled particles are rejected and discharged through the spout 12.

The milled earth, still suspended in the air stream, passes through a pipe 13 into a cyclone or other separator 14 in which it undergoes a process of air separation, the coarser portion passing downwardly through a valve 15 into a bin 16. This bin, which is usually of large capacity, has preferably a bottom converging on one axis only, and may be provided with spouts 18 for the attachment of bagging and packing machines, the spouts being closed at the bottom by these machines or in any preferred manner while the bin is being filled.

The finer material which does not separate from the air in the cyclone is carried forward through a pipe 19 and a blower 20 and is discharged through a pipe 21 to a bag-house, not shown, where the fines are filtered out of the air stream and retained.

Up to this point in the description both the method steps and the elements of apparatus are conventional and are not claimed except insofar as they may enter into combination with the novel steps and elements about to be described.

In the lower portion of the bin I place a conveying screw or helix 25 which passes through a casing 26 arranged to deliver a stream of pulverized earth into pipe 13, which communicates with the discharge side of the blower. This screw is rotated by any convenient power not shown. I do not claim invention in the use of a screw as a conveying means and may use any other type of conveyor or equivalent device for moving a stream of powder from the bottom of the bin into pipe 13.

While the bin 16 is being filled with freshly milled earth delivered by blower 10, a stream of the earth already collected in the bin and withdrawn from its bottom or lower portion is returned to pipe 13. In the passage of this returned earth through pipe 13 and cyclone 14 it is completely and intimately commingled with the fresh supply being delivered into pipe 13 by blower 10. The bin is thus gradually filled, in the same time as would be required were the stream of earth not returned by the conveyor.

It is particularly to be noted that the stream of earth from the bin is returned to the air stream on the discharge, not on the suction side of the blower. This is done for the specific purpose of avoiding the remilling of the product which would occur if the material were again passed through the blower. Such remilling results in a marked lowering of the filtration efficiency and absorptive property and in an increase in the density of the product.

While I do not limit myself to any specific proportion of returned earth to fresh supply, it will be obvious that the larger the proportion of return the more even will be the distribution of the fresh supply through the mass. I have found that where the fresh supply delivered by the blower is at a rate of say four tons per hour, it is desirable to return up to fifteen tons per hour through the conveyor.

In passing repeatedly through the cyclone there is a repetition of the air flotation effect and the fines are more completely and sharply eliminated than is possible in a single passage. This is usually a wholly desirable effect, particularly in the preparation of filtering earths, in which the fines tend strongly to retard the flow rate without materially improving the retention factor.

In some cases, however, it may not be desirable to reduce the proportion of fines, and to enable the circulation to be conducted without this effect I have provided an optional shunt pipe 22 in which the air flow is controlled by joint manipulation of valves 23, 24 and 8. By suitable regulation of these valves the greater portion of the fines may be returned to the circulation and retained in the bin charge. As it is difficult to avoid the introduction of some air into opening 9 with the fresh feed it is equally difficult to make a completely closed circuit, and an amount of air compensating that so introduced must be vented through the bag-house.

As an illustration of one of the benefits resulting from repeated air separation without remilling, accomplished in the manner above described, I cite the following example. A fifteen ton batch of a filtering grade of earth was circulated without any addition of fresh feed, and with continuous separation of fines, until the material had been passed through the separator approximately four times. As a result of the close separation of fines thus produced the flow rate was increased from its original value of 1.00 to an improved value of 1.90, the wet density being increased by only 0.6 pound per cubic foot and the retention value being slightly decreased.

That these results are not procurable other than the manner herein described is shown by the following experiment. The same material was circulated under parallel conditions, with continuous separation of fines, but the feed was returned to the suction side instead of to the discharge side of the blower and the material was thereby remilled. On a single pass through the system the flow rate was reduced from 1.00 to 0.83 and the wet density was increased by 1.7 pounds per cubic foot, showing the extent to which the material had been disintegrated in one passage through the blower.

I claim as my invention:

1. The method of narrowing the size range of comminuted diatomaceous earth which comprises: establishing a flow stream of air and a mass of said earth; withdrawing a stream of said earth from said mass and introducing said earth stream into said air stream, thereby causing said earth to become suspended in said air stream; separating from said air stream the coarser particles of said earth; withdrawing said air stream containing finer particles of said earth in suspension and collecting said finer particles; returning said coarser particles of said earth to said mass, and continuing the circulation of said earth in suspension in said air stream through said separating effect until a desired proportion of finer particles has been removed from said mass.

2. The method of narrowing the size range of comminuted diatomaceous earth which comprises: establishing a flow stream of air and a mass of said earth; withdrawing a stream of said earth from said mass and introducing said earth stream into said air stream, thereby causing said earth to become suspended in said air stream, said earth stream being introduced into said air stream on the discharge side of the means by which said air stream is impelled; separating from said air stream the coarser particles of said earth; withdrawing said air stream containing finer particles of said earth in suspension and collecting said finer particles; returning said coarser particles of said earth to said mass, and continuing the circulation of said earth in suspension in said air stream through said separating effect until a desired proportion of finer particles has been removed from said mass.

3. The method of intermixing and equalizing supplies of comminuted diatomaceous earth which comprises: creating a flow stream of air; introducing into said air stream a stream of said earth from the lower portion of a receptacle, thereby causing said earth to become suspended in said air stream; separating the coarser particles of said earth from said air stream; returning said separated particles to an upper part of said receptacle; returning a controlled proportion of the air stream withdrawn from said separating effect and containing only said finer particles of said earth in suspension to a point in said air stream in advance of said separating effect, and withdrawing the remainder of last said air stream.

4. The method of intermixing and equalizing supplies of comminuted diatomaceous earth which comprises: creating a flow stream of air; introducing into said air stream a stream of said earth from the lower portion of a receptacle, thereby causing said earth to become suspended in said air stream, said earth stream being introduced into said air stream on the discharge side of the means by which said air stream is impelled; separating the coarser particles of said earth from said air stream; returning said separated particles to an upper portion of said receptacle; returning a controlled proportion of the air stream withdrawn from said separating effect and containing only said finer particles of said earth in suspension to a point in said air stream in advance of said separating effect, and withdrawing the remainder of last said air stream.

5. The method of intermixing and equalizing supplies of comminuted diatomaceous earth which comprises: creating a flow stream of air containing in suspension finer particles of said earth; introducing into said air stream a stream of first said earth from the lower portion of a receptacle and a separate stream of said earth from another source, thereby causing said earths to become intermixed and suspended in said air stream, first said earth stream being introduced into said air stream on the discharge side of the means by which said air stream is impelled and second said earth stream on the suction side of said means; separating the coarser particles of said mixed earths from said air stream; returning said separated particles to an upper portion of said receptacle, and returning the air stream withdrawn from said separating effect and containing finer particles of said earths in suspension to the suction side of said air stream impelling means.

McKINLEY STOCKTON.